(12) United States Patent
Adams

(10) Patent No.: US 7,465,143 B1
(45) Date of Patent: Dec. 16, 2008

(54) LOAD CONTROL SYSTEM FOR A ROLL OFF TRAILER

(76) Inventor: Bill J. Adams, 2719 40th Ave. North, Fargo, ND (US) 58102

( * ) Notice: Subject to any disclaimer, the term of this patent is extended or adjusted under 35 U.S.C. 154(b) by 0 days.

(21) Appl. No.: 11/425,445

(22) Filed: Jun. 21, 2006

(51) Int. Cl.
*B60P 1/00* (2006.01)

(52) U.S. Cl. ..................... 414/530; 193/35 A

(58) Field of Classification Search .............. 414/530; 193/35 A
See application file for complete search history.

(56) References Cited

U.S. PATENT DOCUMENTS

| | | | | |
|---|---|---|---|---|
| 468,559 | A | * | 2/1892 | Chatfield .................. 414/469 |
| 3,043,405 | A | * | 7/1962 | Sussebach .............. 188/151 R |
| 3,068,966 | A | * | 12/1962 | Knapmeyer ................. 188/170 |
| 3,203,509 | A | * | 8/1965 | Bohn ........................... 188/75 |
| 3,655,021 | A | | 4/1972 | Froio |
| 3,789,960 | A | | 2/1974 | Warren |
| 3,881,585 | A | | 5/1975 | Coleman et al. |
| 3,891,073 | A | | 6/1975 | Coleman et al. |
| 3,900,118 | A | * | 8/1975 | Kellogg ....................... 414/530 |
| 3,918,561 | A | | 11/1975 | Isacsson |
| 3,934,740 | A | | 1/1976 | Rumell |
| 4,168,771 | A | | 9/1979 | Krivec |
| 4,488,638 | A | | 12/1984 | Morgan et al. |
| 4,806,061 | A | | 2/1989 | Fenton |
| 4,919,445 | A | | 4/1990 | Robey |
| 5,009,567 | A | | 4/1991 | Fenton |
| 5,086,903 | A | | 2/1992 | Agnoff |
| 5,102,286 | A | | 4/1992 | Fenton |
| 5,137,414 | A | | 8/1992 | Sloan et al. |
| 5,324,160 | A | | 6/1994 | Smith |
| 5,452,607 | A | | 9/1995 | Axtell |
| 5,478,190 | A | * | 12/1995 | Helton ....................... 414/530 |
| 5,490,587 | A | | 2/1996 | Fisher |
| 5,884,744 | A | | 3/1999 | Slodkowski |
| 6,220,418 | B1 | | 4/2001 | Moradians |
| 6,234,292 | B1 | | 5/2001 | Schut |
| 6,763,930 | B2 | * | 7/2004 | Johnson et al. .......... 198/459.6 |

\* cited by examiner

*Primary Examiner*—Saul J. Rodriguez
*Assistant Examiner*—Joshua I Rudawitz

(57) ABSTRACT

A load control system for a roll off trailer for effectively controlling the velocity of a load during unloading. The load control system for a roll off trailer includes a shaft, an actuator connected to the shaft, a plurality of levers pivotally attached to a roll off trailer, and a plurality of brake shoes attached to the plurality of levers. The plurality of brake shoes are aligned with corresponding rollers on the roll off trailer to selectively frictionally engage the rollers.

16 Claims, 14 Drawing Sheets

LOAD CONTROL SYSTEM FOR A ROLL OFF TRAILER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to roll off trailers and more specifically it relates to a load control system for a roll off trailer for effectively controlling the velocity of a load during unloading.

2. Description of the Related Art

Any discussion of the prior art throughout the specification should in no way be considered as an admission that such prior art is widely known or forms part of common general knowledge in the field.

Roll off trailers (independent trailers and truck trailers) have been in use for years. A roll off trailer includes a flatbed with a plurality of rollers aligned transverse with the length of the flatbed. The rollers extend upwardly from the upper surface of the flatbed a finite distance sufficient to engage and support the load. When the flatbed is typically elevated at an angle to unload the load (e.g. trusses, wall panels, etc.) which causes the load to roll off the roll off trailer. Hence, there is a need to control the velocity that a load rolls off the roll off trailer to prevent damage to the load.

BRIEF SUMMARY OF THE INVENTION

In view of the foregoing disadvantages inherent in the known types of roll off trailers now present in the prior art, the present invention provides a new load control system for a roll off trailer construction wherein the same can be utilized for effectively controlling the velocity of a load during unloading.

The general purpose of the present invention, which will be described subsequently in greater detail, is to provide a new load control system for a roll off trailer that has many of the advantages of the roll off trailers mentioned heretofore and many novel features that result in a new load control system for a roll off trailer which is not anticipated, rendered obvious, suggested, or even implied by any of the prior art roll off trailers, either alone or in any combination thereof.

To attain this, the present invention generally comprises a shaft, an actuator connected to the shaft, a plurality of levers pivotally attached to a roll off trailer, and a plurality of brake shoes attached to the plurality of levers. The plurality of brake shoes are aligned with corresponding rollers on the roll off trailer to selectively frictionally engage the rollers.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a load control system for a roll off trailer that will overcome the shortcomings of the prior art devices.

A second object is to provide a load control system for a roll off trailer for effectively controlling the velocity of a load during unloading.

Another object is to provide a load control system for a roll off trailer that controls the rotation of a plurality of rollers in a roll off trailer.

An additional object is to provide a load control system for a roll off trailer that allows for adjustment of the unloading velocity for a load.

A further object is to provide a load control system for a roll off trailer that may be utilized upon various types of roll off trailers.

Another object is to provide a load control system for a roll off trailer that provides uniform control over a load during unloading.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
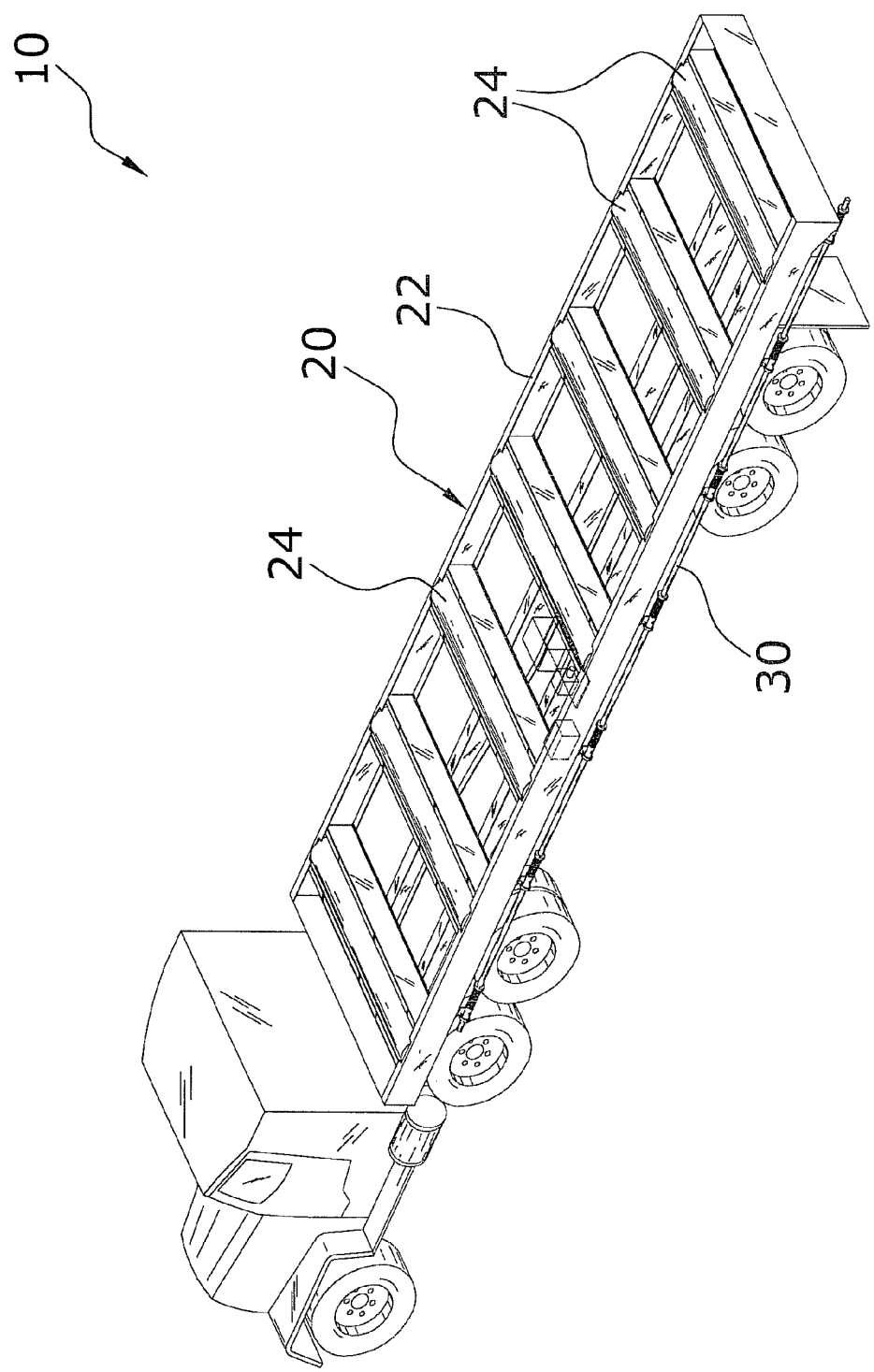
FIG. 1 is an upper perspective view of the present invention attached to an exemplary roll off trailer.

Turning now descriptively to the drawings, in which similar reference characters denote similar elements throughout the several views, FIGS. 1 through 9 illustrate a load control system for a roll off trailer 10, which comprises a shaft 30, an actuator 70 connected to the shaft 30, a plurality of levers 50 pivotally attached to a roll off trailer 20, and a plurality of brake shoes 40 attached to the plurality of levers 50. The plurality of brake shoes 40 are aligned with corresponding rollers 24 on the roll off trailer 20 to selectively frictionally engage the rollers 24.

B. Roll Off Trailer

FIG. 1 best illustrates an exemplary roll off trailer 20 having a frame 22 with a plurality of substantially parallel rollers 24 extending slightly above the upper surface of the frame 22. The roll off trailer 20 may be comprised of a truck style as shown in the figures or a pull behind type of trailer. The figures should not limit in any way the type of roll off trailers 20 suitable for use with the present invention. It is preferable that the roll off trailer 20 be able to tilt the bed thereof to unload the load 12 therefrom.

C. Shaft

Figure 6:
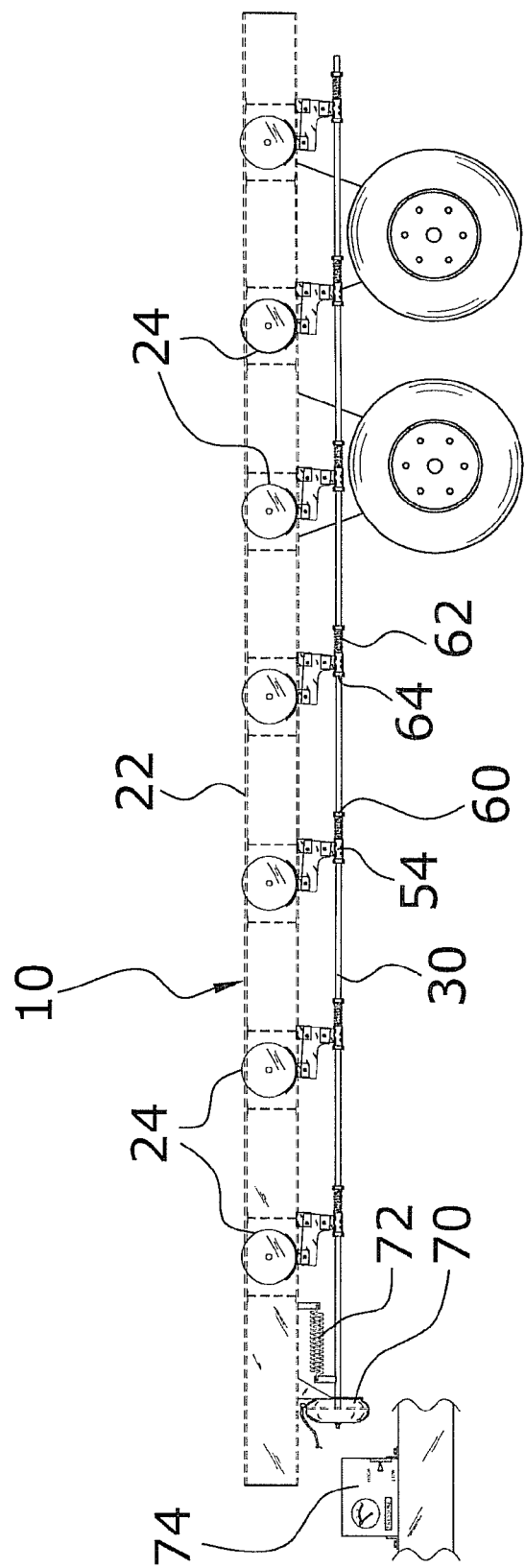
FIG. 6 is a side view of the present invention attached to a roll off trailer.

As best illustrated in FIGS. 1 and 6 of the drawings, a shaft 30 extends a substantial length of a roll off trailer 20. In particular, the shaft 30 extends sufficient to allow for the brake shoes 40 to engage at least a significant portion of the rollers 24 of the roll off trailer 20. The shaft 30 preferably extends substantially parallel to a longitudinal axis of the roll off trailer 20 as best illustrated in FIG. 1 of the drawings. The shaft 30 may be comprised of a solid or hollow structure.

D. Actuator

At least one actuator 70 is connected to the shaft 30 to move the shaft 30 forwardly and rearwardly. The movement of the shaft 30 causes the engagement and non-engagement of the brake shoes 40 with the corresponding rollers 24.

Figure 9:
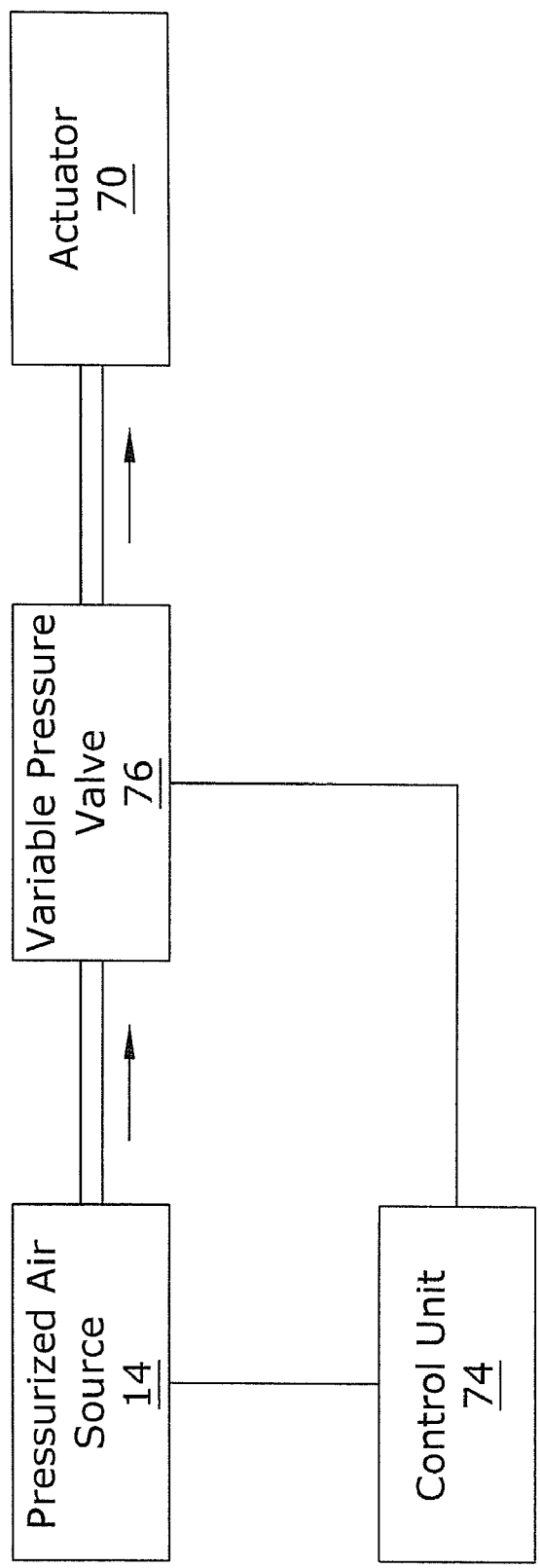
FIG. 9 is a block diagram of the air system features of the present invention.

The actuator 70 is preferably comprised of an air powered device that operates off pressurized air, wherein increasing air pressure to the actuator 70 increases a frictional engagement of the plurality of rollers 24 by the plurality of brake shoes 40, and wherein decreasing air pressure to the actuator 70 decreases a frictional engagement of the plurality of rollers 24 by the plurality of brake shoes 40. A variable pressure valve 76 is fluidly connected to the actuator 70 as shown in FIG. 9 of the drawings. A pressurized air source 14 is fluidly connected to the variable pressure valve 76 to provide controlled pressurized air to the actuator 70. The pressurized air source 14 is preferably comprised of an existing pressurized air system on the roll off trailer 20, however the pressurized air source 14 may be comprised of various other structures.

A control unit 74 is in communication with and controlling the variable pressure valve 76 as shown in FIG. 9 of the drawings. The control unit 74 is further preferably in communication with and controlling the pressurized air source 14. The control unit 74 includes a control panel that allows the user to regulate the amount of air pressure supplied to the actuator 70. As the air pressure is increased or decreased by the control unit 74, the control unit 74 signals the variable pressure valve 76 to increase or decrease the outgoing air pressure to the actuator 70 accordingly. A meter or other display is preferably positioned within the control unit 74 to display the amount of pressure applied to the actuator 70 as shown FIGS. 7a through 7d of the drawings.

A tension spring 72 is preferably connected between the shaft 30 and the frame 22 of the roll off trailer 20 to provide a force opposite of the actuator 70. The force from the tension spring 72 attempts to return the shaft 30 and the brake shoes 40 to a more relaxed position so that the brake shoes 40 are not in frictional engagement with the rollers 24.

E. Levers

Figure 2:
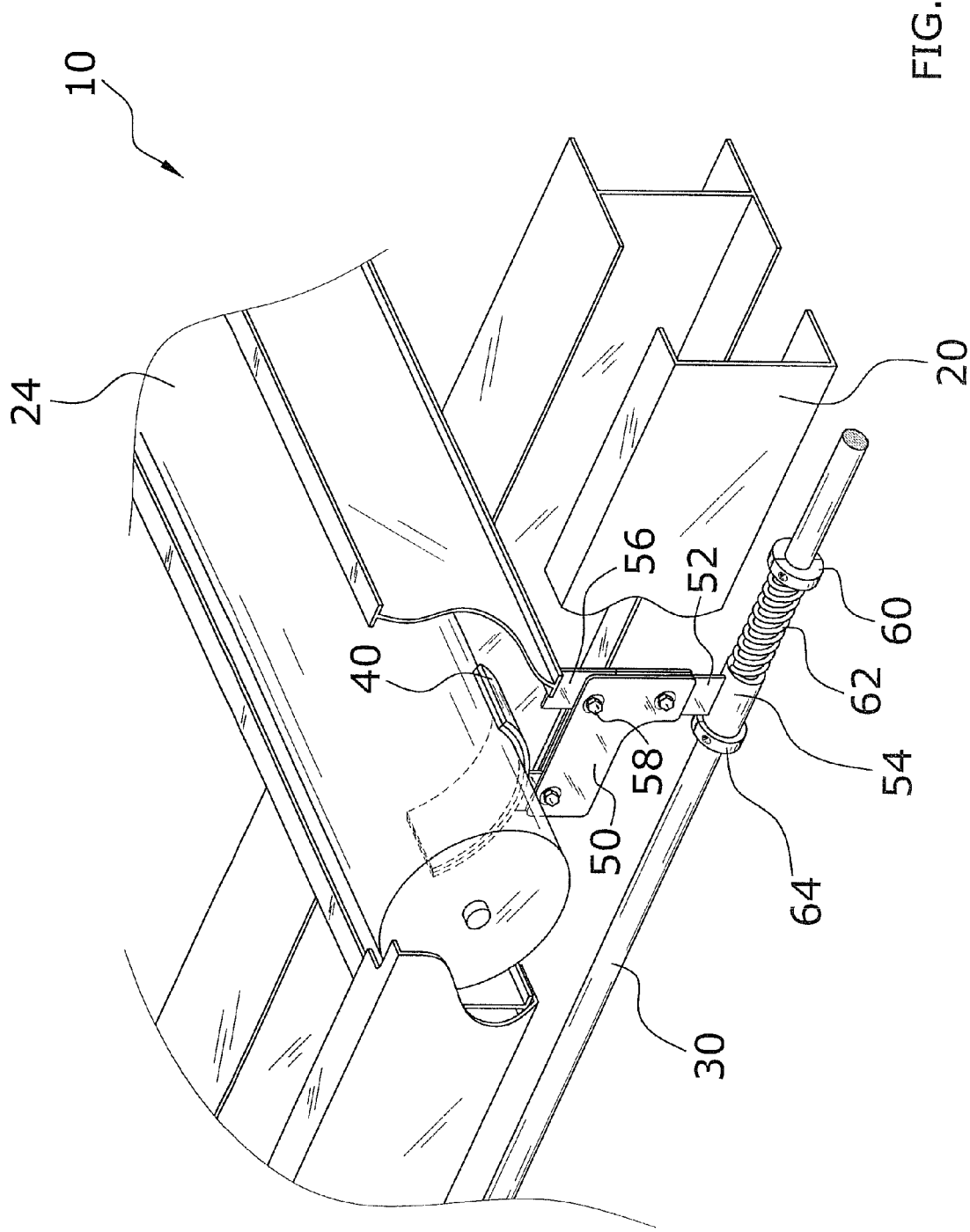
FIG. 2 is a magnified rear upper perspective view of the present invention.
Figure 3:
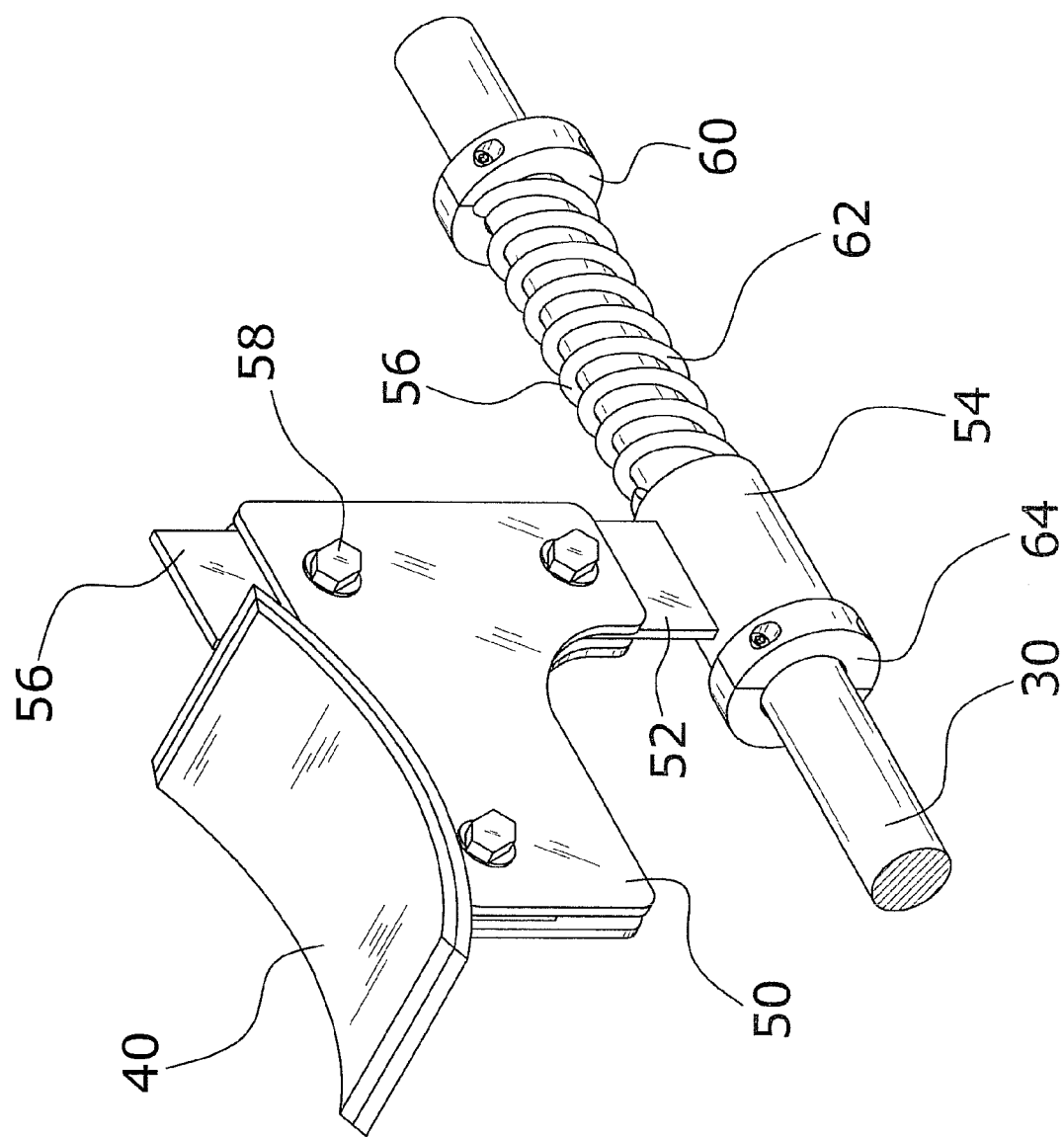
FIG. 3 is a magnified front upper perspective view of the present invention.
Figure 4:
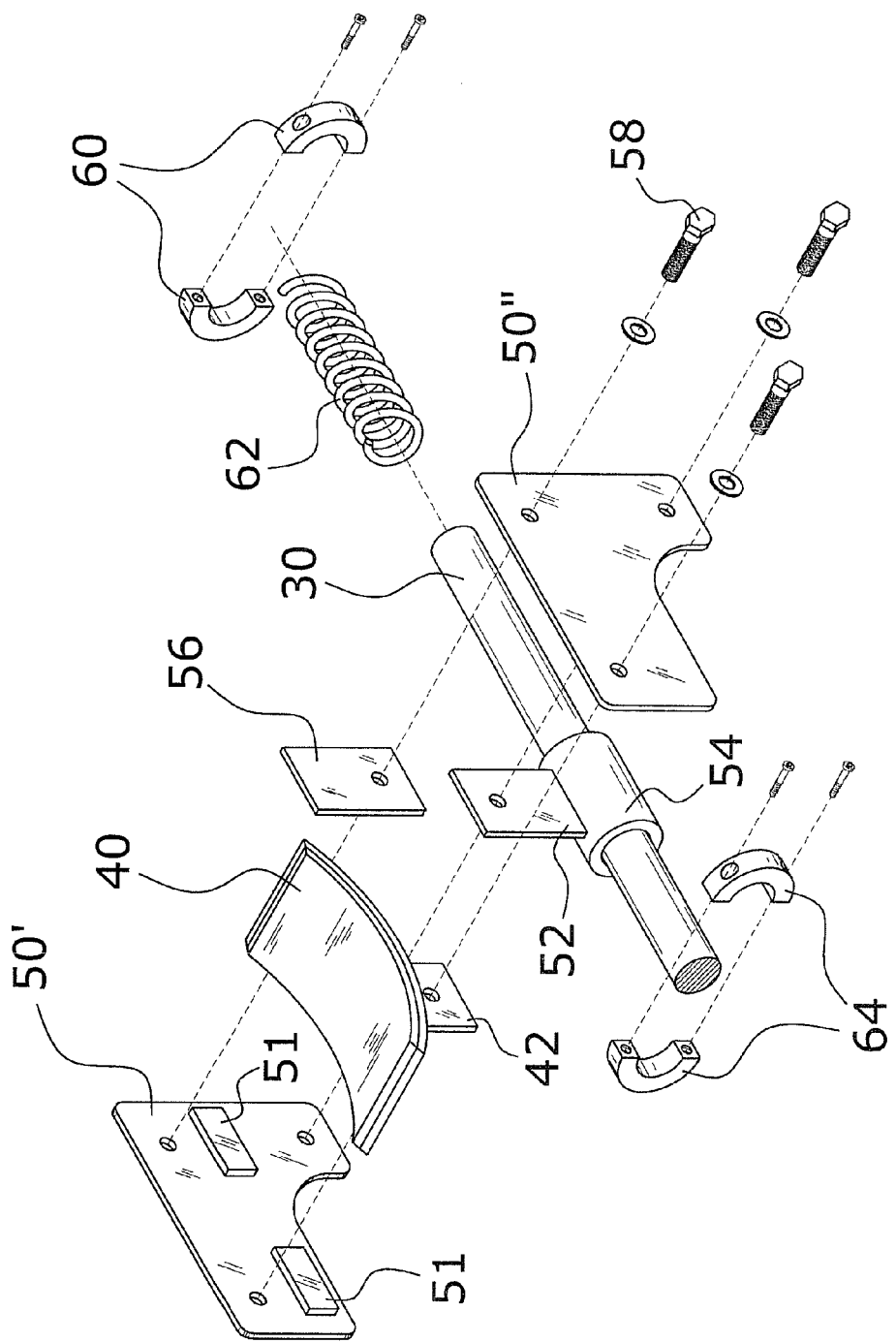
FIG. 4 is an exploded upper perspective view of the present invention.
Figure 5A:
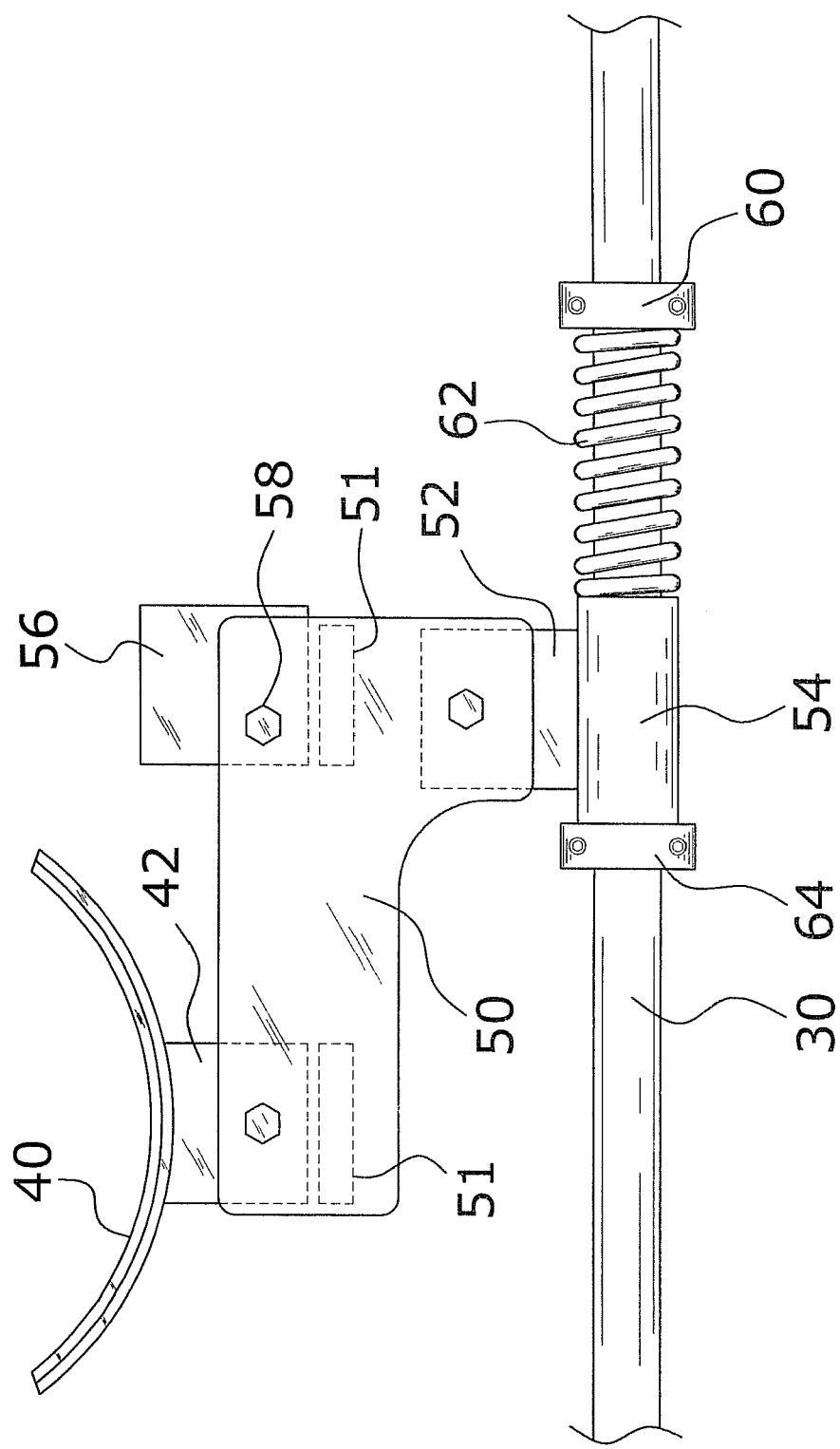
FIG. 5a is a magnified side view of the present invention.
Figure 5B:
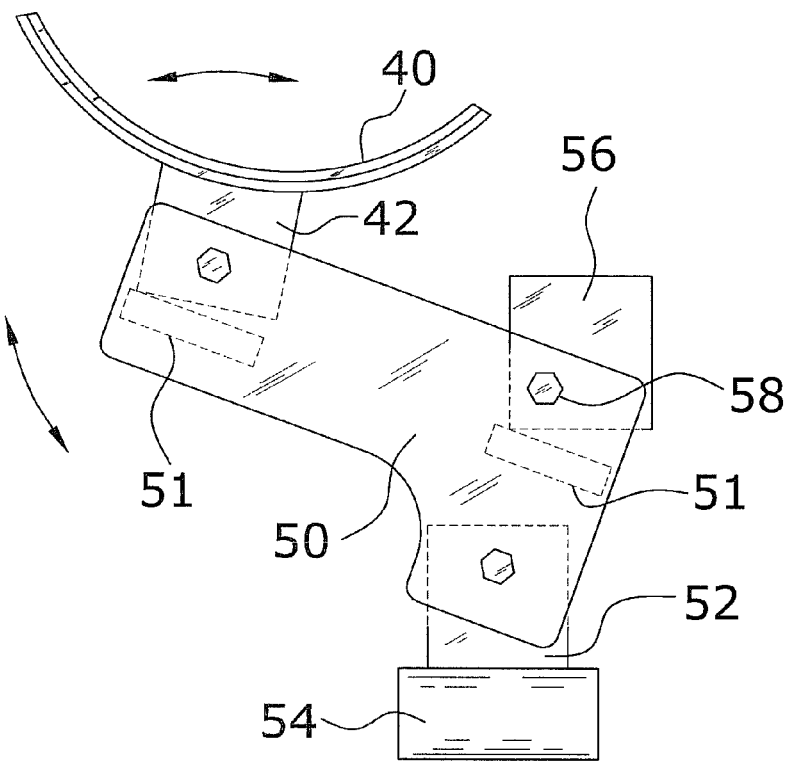
FIG. 5b is a side view of the present invention illustrating movement of the brake shoe in a first direction.
Figure 5C:
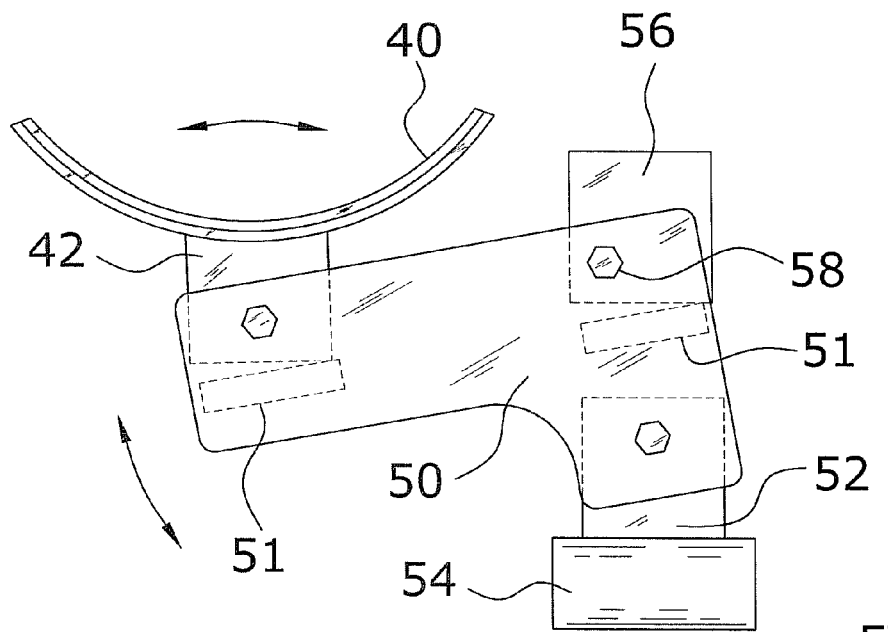
FIG. 5c is a side view of the present invention illustrating movement of the brake shoe in a second direction.

A plurality of levers 50 are pivotally attached to the roll off trailer 20 as shown in FIG. 6 of the drawings. A first end of each of the plurality of levers 50 is connected to the shaft 30 as best illustrated in FIG. 2 of the drawings. The plurality of levers 50 are preferably adjustably connected to the shaft 30 by a connecting structure corresponding to each of the plurality of levers 50.

The connecting structure is preferably comprised of a guide member 54 slidably attached to the shaft 30, a compression spring 62 positioned about the shaft 30 on a side of the guide member 54 away from the plurality of brake shoes 40, an engaging collar 60 attached to the shaft 30 adjacent to the compression spring 62 opposite of the guide member 54, and a stopper collar 64 attached to the shaft 30 opposite of the engaging collar 60 as best illustrated in FIGS. 2 through 5c of the drawings. The guide member 54 is preferably comprised of a tubular structure that is slidable upon the shaft 30. A lower member 52 is preferably attached to the guide member 54 and extends upwardly to pivotally connect to the lever 50.

An upper member 56 is preferably pivotally attached to the lever 50 by a pivot shaft 58. The upper member 56 is preferably secured to the frame 22 of the roll off trailer 20 to provide a stable pivot point for the lever 50.

The lever 50 preferably has a first side 50' and a second side 50" wherein one or more stopper members 51 are attached between thereof to limit the movement of the brake shoe 40 and the lever 50. The engaging collar 60 may be comprised of any collar attachable about the shaft 30 to secure the compression spring 62 between the engaging collar 60 and the guide member 54. The stopper collar 64 is preferably comprised of a structure similar to the engaging collar 60.

F. Brake Shoes

A plurality of brake shoes 40 are attached to a second end of the plurality of levers 50 as shown in FIG. 6 of the drawings. The plurality of brake shoes 40 are each aligned with a plurality of rollers 24 on the roll off trailer 20 to selectively frictionally engage the plurality of rollers 24 as further shown in FIG. 6 of the drawings. In particularly, the number of the plurality of brake shoes 40 preferably equals a number of the plurality of rollers 24 to allow for control over all of the rollers 24 of the roll off trailer 20. The brake shoes 40 may be comprised of any structure capable of frictionally engaging the rollers 24 without undue wearage (similar to vehicle brake pads).

As best illustrated in FIGS. 3 through 5c of the drawings, the plurality of brake shoes 40 are each preferably comprised of a C-shaped structure that conforms to the shape of the rollers 24. The plurality of brake shoes 40 are preferably pivotally connected to the lever 50 to allow for adjustment with respect to the rollers 24 thereby ensuring complete engagement with the rollers 24. The stopper member 51 within the lever 50 limits the amount of movement of the brake shoe 40 during operation and assembly.

G. Operation of Invention

Figure 7A:
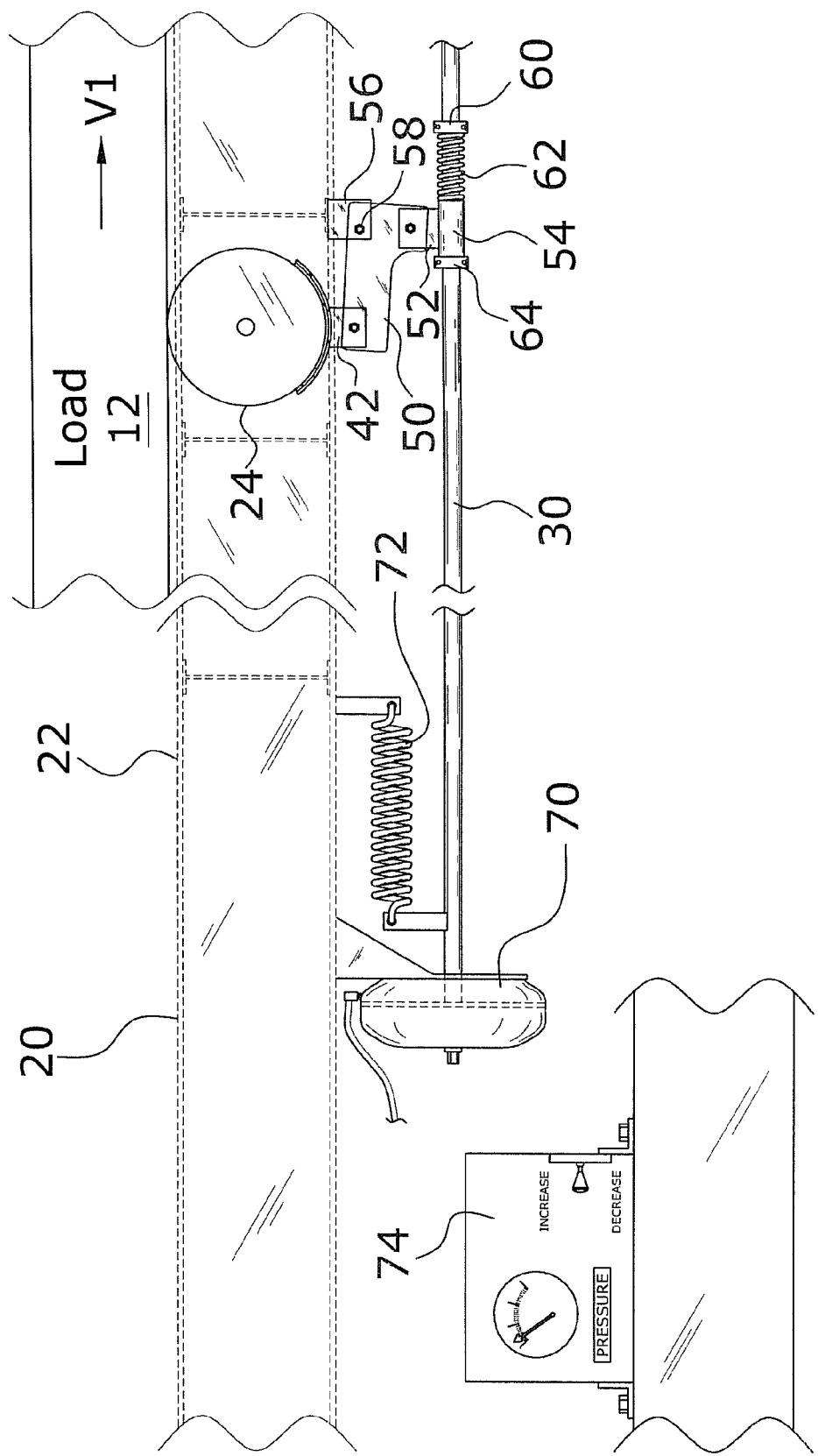
FIG. 7a is a magnified side view of the present invention with low air pressure applied to the actuators resulting in a low resistance applied to the rollers thereby allowing an unloading velocity V1.
Figure 7B:
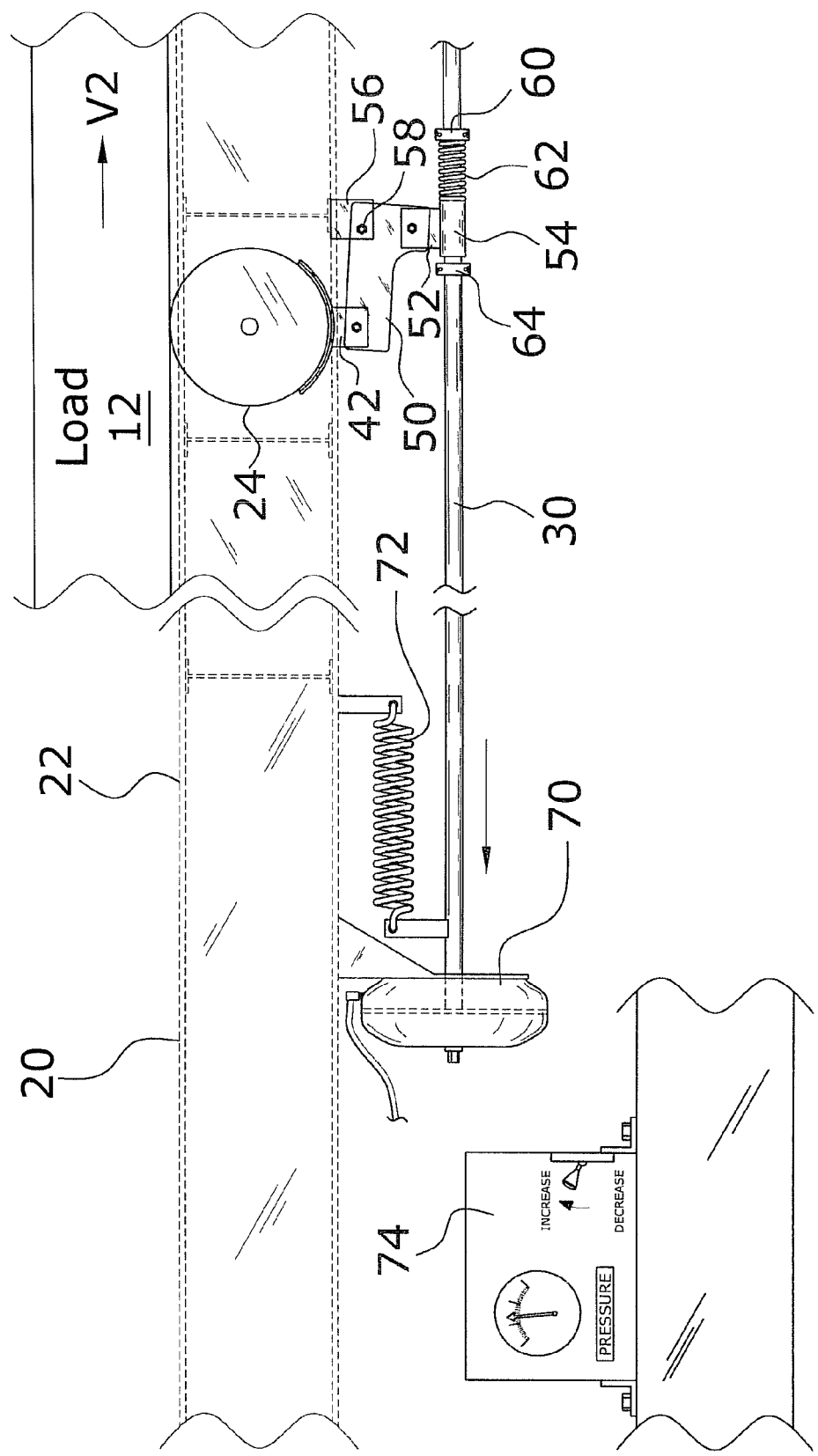
FIG. 7b is a magnified side view of the present invention with the air pressure applied to the actuators increased resulting in a higher resistance applied to the rollers thereby allowing an unloading velocity V2, wherein velocity V2 is less than velocity V1.
Figure 7C:
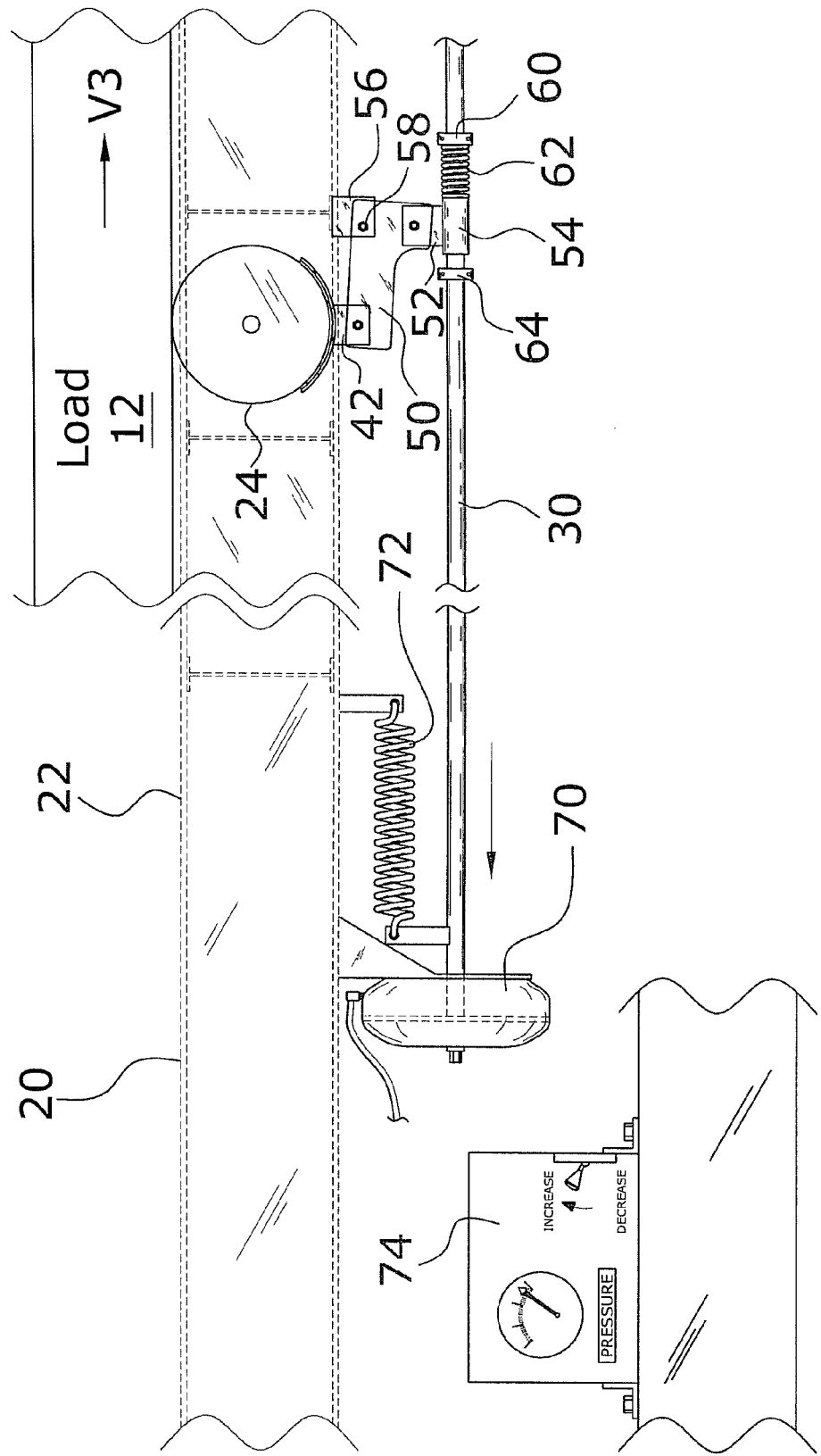
FIG. 7c is a magnified side view of the present invention with the air pressure applied to the actuators increased resulting in a higher resistance applied to the rollers thereby allowing an unloading velocity V3, wherein velocity V3 is less than velocity V2.
Figure 7D:
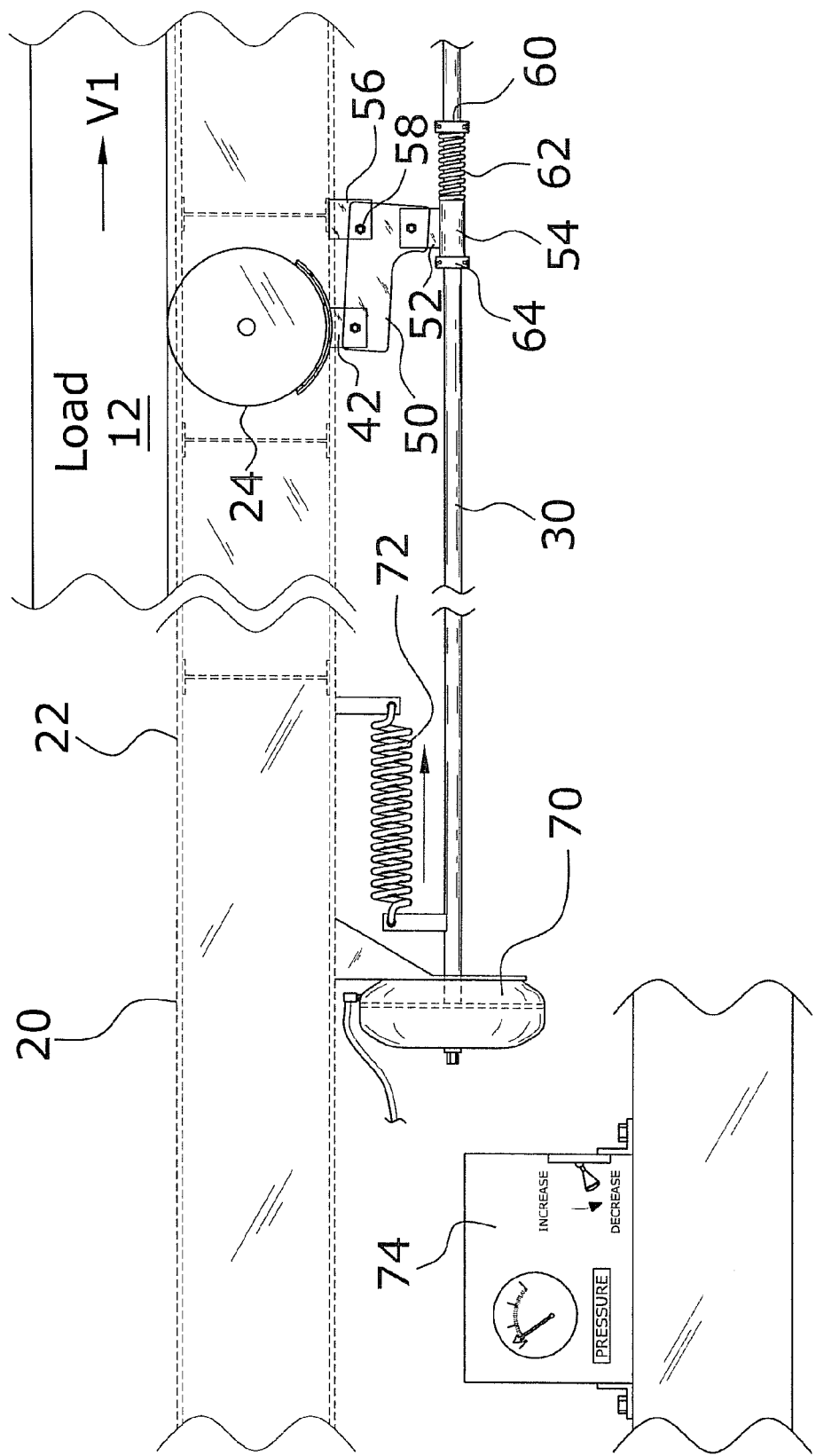
FIG. 7d is a magnified side view of the present invention with the air pressure decreased to the actuators.
Figure 8A:
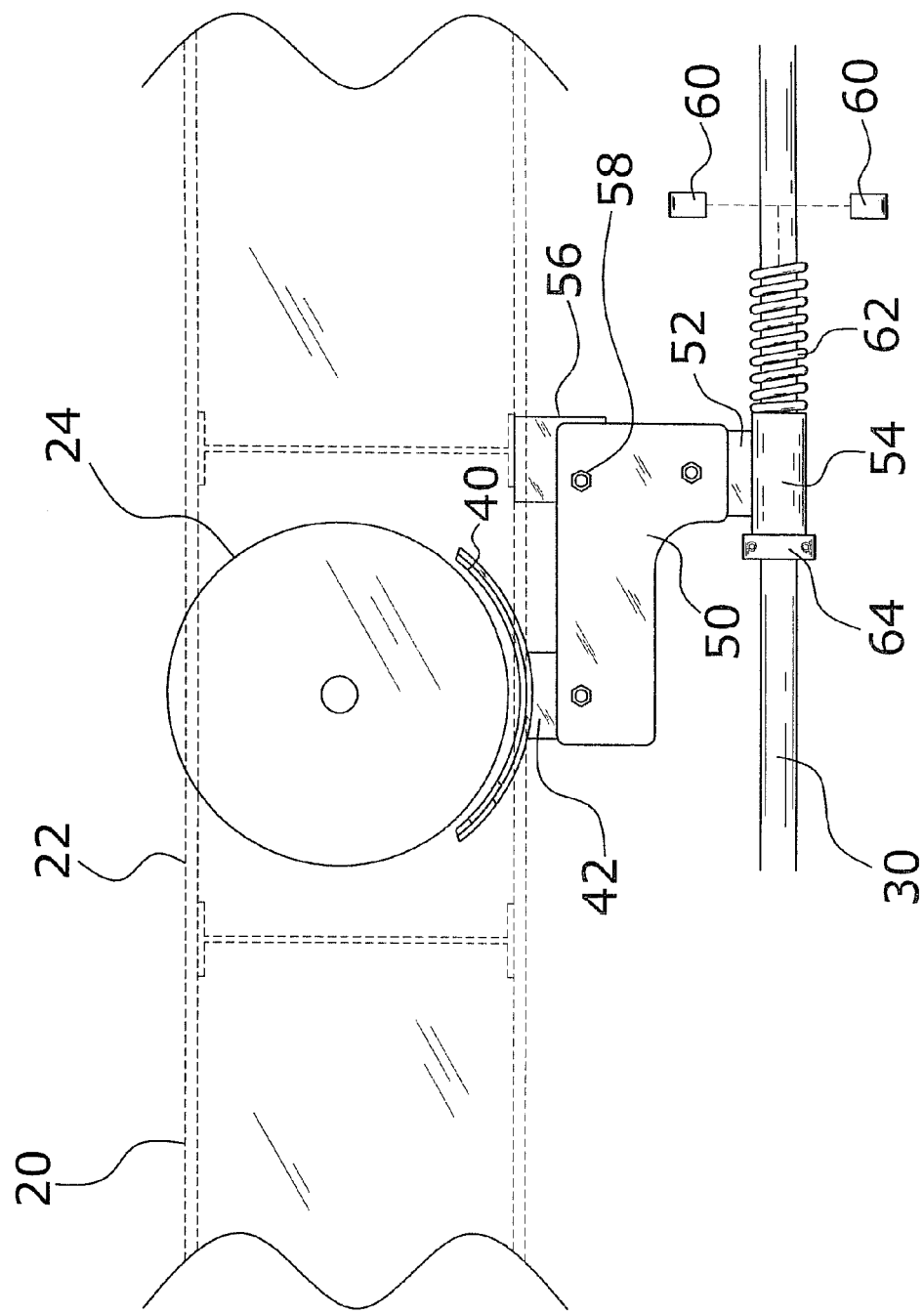
FIG. 8a is a magnified side view of the present invention with the brake shoe in a relaxed position away from the roller during assembly.
Figure 8B:
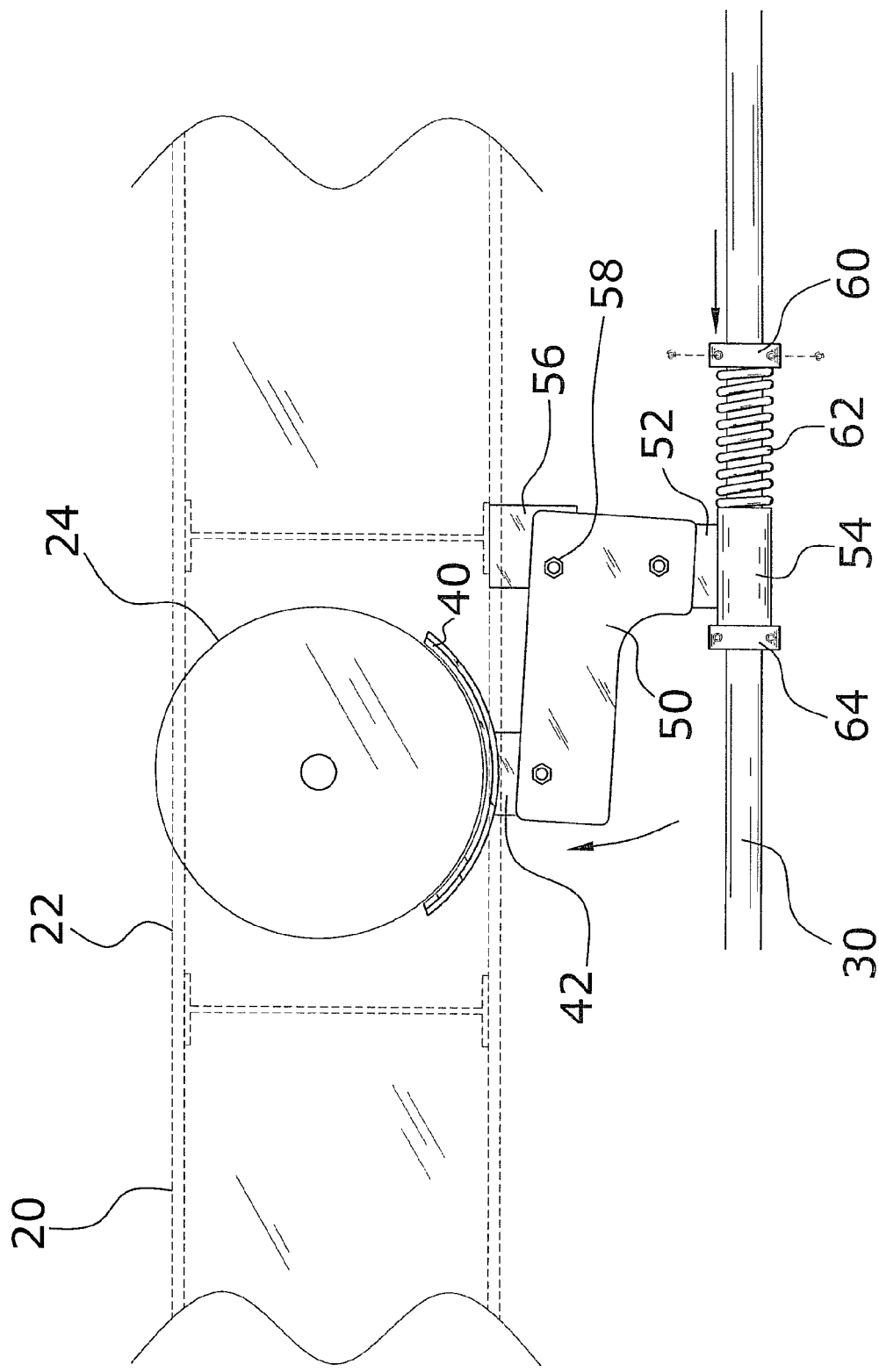
FIG. 8b is a magnified side view of the present invention with the brake shoe slightly away from the roller after being assembled.

In use, a load 12 (e.g. trusses) is placed upon the roll off trailer 20 via a forklift or other means. The load 12 is then transported to the desired location. The roll off trailer 20 is then activated to tilt the bed of the roll off trailer 20 thereby resulting in the load 12 being positioned upon the bed in an angled manner. The force of gravity (and any additional forces directly applied) results in the downward movement of the load 12 from the roll off trailer 20. The preset adjustment of the air pressure to the actuator 70 determines the frictional force applied to the rollers 24 by the brake shoes 40 thereby controlling the unloading velocity of the load 12. As shown in FIG. 7a of the drawings, the unloading velocity V1 is increased because of the low resistance applied by the brake shoes 40. As shown in FIG. 7b of the drawings, the unloading velocity V2 is decreased compared to velocity V1 because of the increased resistance applied by the brake shoe 40. As shown in FIG. 7c of the drawings, the unloading velocity V3 is decreased compared to velocity V2 because of the increased resistance applied by the brake shoes 40. The operator controls the unloading velocity to ensure that the load 12 is not damaged during unloading. Once the load 12 is unloaded, the above process can be repeated.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A load control system for a roll off trailer, comprising:
   a shaft;
   an actuator connected to said shaft to move said shaft;
   a plurality of levers pivotally attached to a roll off trailer, wherein a first end of each of said plurality of levers is connected to said shaft; and
   a plurality of brake shoes pivotally attached to a second end of said plurality of levers, wherein said plurality of brake shoes are each aligned with a plurality of rollers on said roll off trailer to selectively frictionally engage said plurality of rollers;
   wherein said plurality of levers are adjustably connected to said shaft by a connecting structure corresponding to each of said plurality of levers, wherein said connecting structure is comprised of:
   a guide member slidably attached to said shaft;
   a compression spring positioned about said shaft on a side of said guide member away from said plurality of brake shoes; and
   an engaging collar attached to said shaft adjacent to said compression spring opposite of said guide member.

2. The load control system for a roll off trailer of claim 1, wherein a number of said plurality of brake shoes equals a number of said plurality of rollers.

3. The load control system for a roll off trailer of claim 1, wherein said shaft extends a length of said roll off trailer.

4. The load control system for a roll off trailer of claim 1, wherein said shaft extends parallel to a longitudinal axis of said roll off trailer.

5. The load control system for a roll off trailer of claim 1, wherein said actuator is comprised of an air powered device.

6. The load control system for a roll off trailer of claim 5, including:
   a variable pressure valve fluidly connected to said actuator;
   a pressurized air source fluidly connected to said variable pressure valve; and
   a control unit in communication with and controlling said variable pressure valve.

7. The load control system for a roll off trailer of claim 6, wherein said control unit is in communication with and controlling said pressurized air source.

8. The load control system for a roll off trailer of claim 6, wherein said pressurized air source is comprised of an existing pressurized air system on said roll off trailer.

9. The load control system for a roll off trailer of claim 6, wherein increasing air pressure to said actuator increases a frictional engagement of said plurality of rollers by said plurality of brake shoes.

10. The load control system for a roll off trailer of claim 6, wherein decreasing air pressure to said actuator decreases a frictional engagement of said plurality of rollers by said plurality of brake shoes.

11. The load control system for a roll off trailer of claim 1, wherein said plurality of brake shoes are each comprised of a curved structure.

12. The load control system for a roll off trailer of claim 1, wherein said plurality of brake shoes are each comprised of a C-shaped structure.

13. The load control system for a roll off trailer of claim 1, including a stopper collar attached to said shaft opposite of said engaging collar.

14. A load control system for a roll off trailer, comprising:
    a shaft that extends a length of a roll off trailer, wherein said shaft extends parallel to a longitudinal axis of said roll off trailer;
    an actuator connected to said shaft to move said shaft;
    a plurality of levers pivotally attached to said roll off trailer, wherein a first end of each of said plurality of levers is connected to said shaft;
    a plurality of brake shoes attached to a second end of said plurality of levers, wherein said plurality of brake shoes are each aligned with a plurality of rollers on said roll off trailer to selectively frictionally engage said plurality of rollers;

wherein a number of said plurality of brake shoes equals a number of said plurality of rollers;

wherein said plurality of brake shoes are each comprised of a C-shaped structure;

wherein said plurality of brake shoes are pivotally connected to said lever;

wherein said actuator is comprised of an air powered device, wherein increasing air pressure to said actuator increases a frictional engagement of said plurality of rollers by said plurality of brake shoes, and wherein decreasing air pressure to said actuator decreases a frictional engagement of said plurality of rollers by said plurality of brake shoes;

a variable pressure valve fluidly connected to said actuator;

a pressurized air source fluidly connected to said variable pressure valve;

a control unit in communication with and controlling said variable pressure valve;

wherein said plurality of levers are adjustably connected to said shaft by a connecting structure corresponding to each of said plurality of levers, wherein said connecting structure is comprised of:

a guide member slidably attached to said shaft;

a compression spring positioned about said shaft on a side of said guide member away from said plurality of brake shoes;

an engaging collar attached to said shaft adjacent to said compression spring opposite of said guide member; and a stopper collar attached to said shaft opposite of said engaging collar.

15. The load control system for a roll off trailer of claim 14, wherein said control unit is in communication with and controlling said pressurized air source.

16. The load control system for a roll off trailer of claim 14, wherein said pressurized air source is comprised of an existing pressurized air system on said roll off trailer.

* * * * *